June 20, 1944. F. VON OPEL 2,352,045
FASTENING DEVICE
Filed June 18, 1942 3 Sheets-Sheet 1
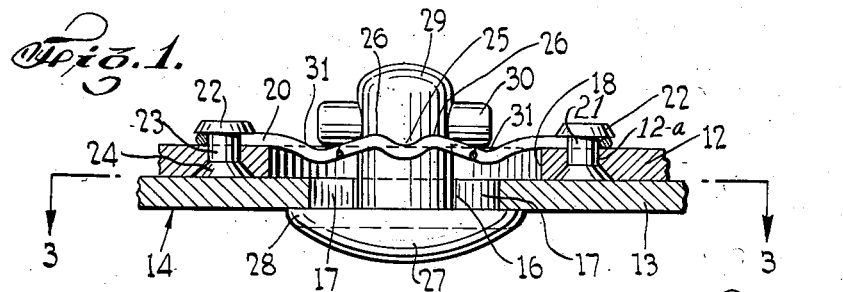
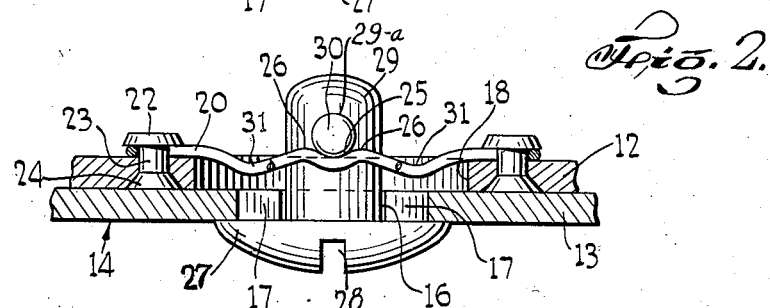
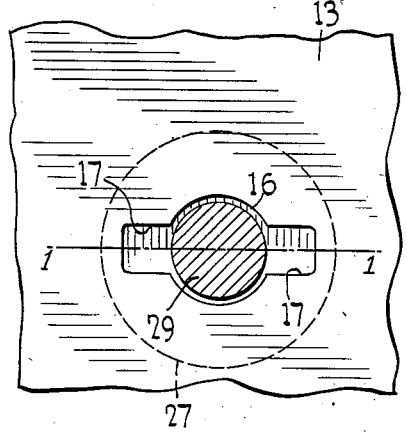
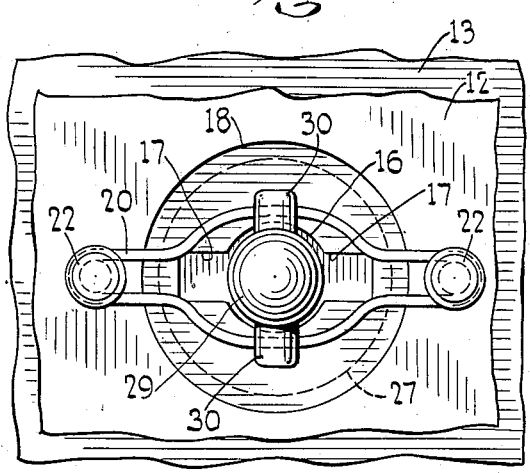
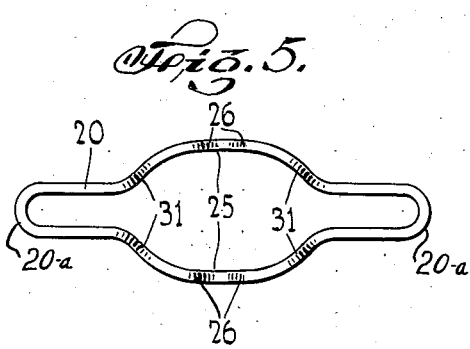
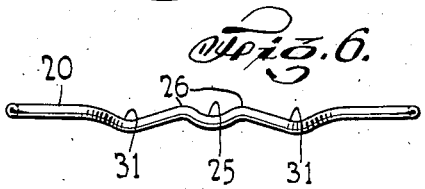
INVENTOR.
FRITZ VON OPEL
BY
ATTORNEY June 20, 1944.   F. VON OPEL   2,352,045
FASTENING DEVICE
Filed June 18, 1942    3 Sheets-Sheet 2
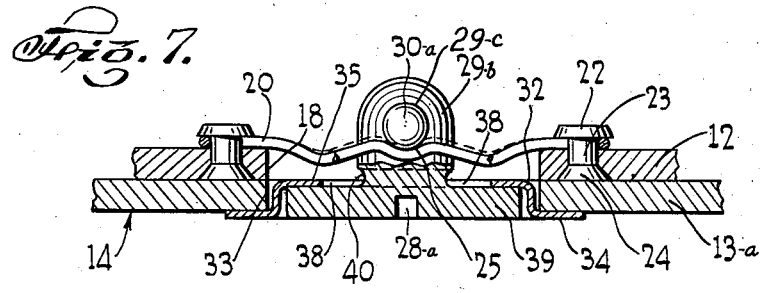
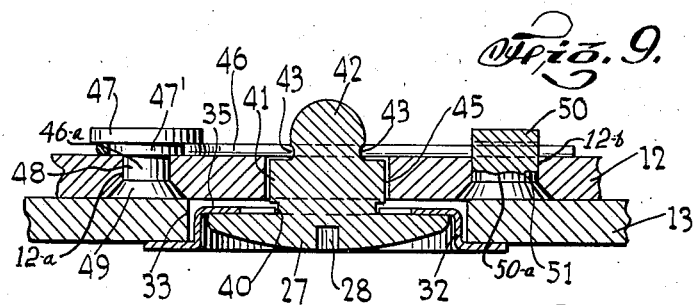
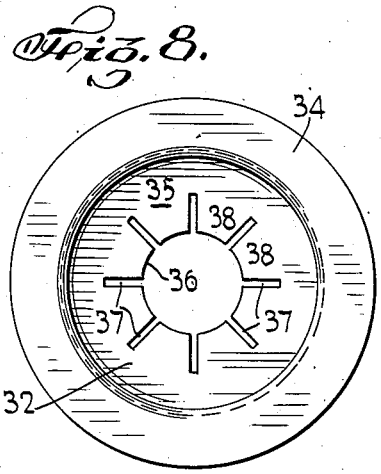
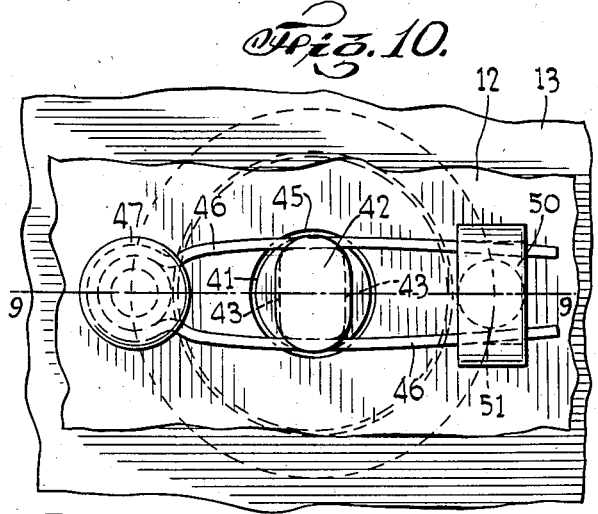
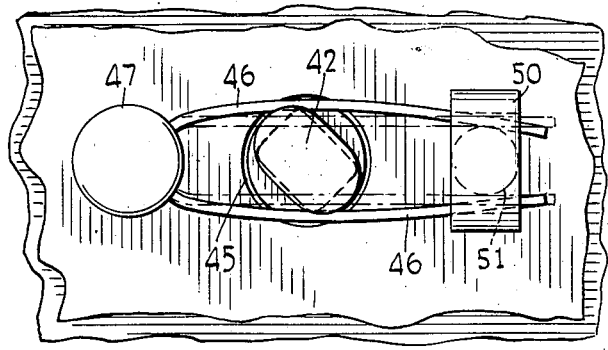
INVENTOR.
FRITZ VON OPEL
BY J. O. Ollier
ATTORNEY

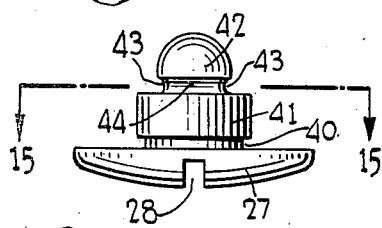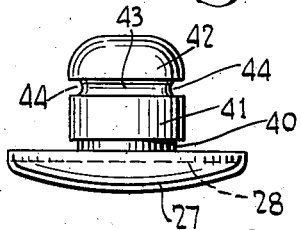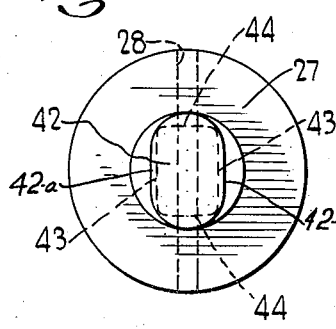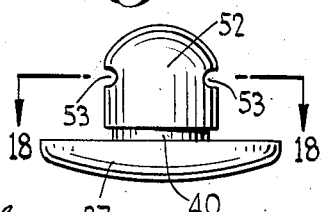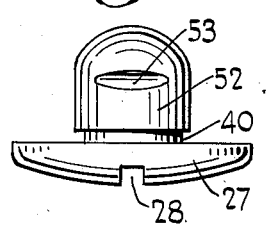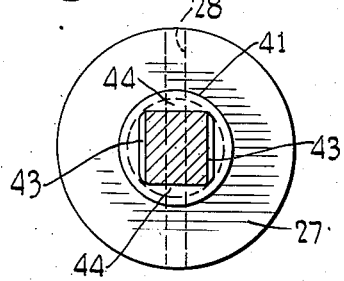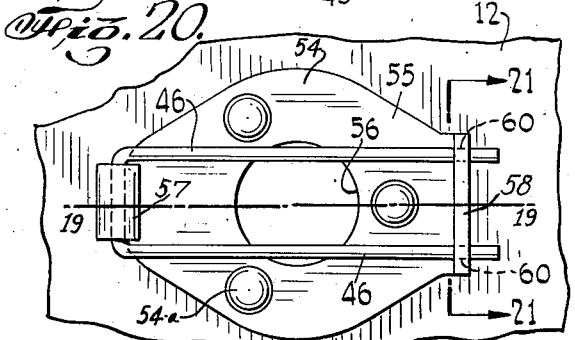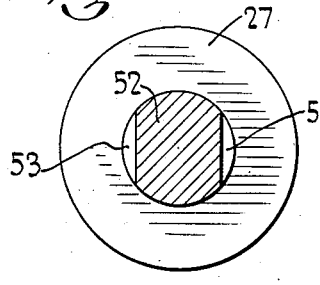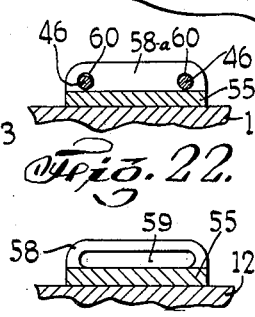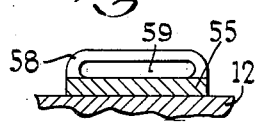
INVENTOR.
FRITZ VON OPEL
BY J. O. Ollier
ATTORNEY Patented June 20, 1944

2,352,045

UNITED STATES PATENT OFFICE 2,352,045

FASTENING DEVICE

Fritz von Opel, Miami, Fla.; vested in the Alien Property Custodian

Application June 18, 1942, Serial No. 447,499

5 Claims. (Cl. 24—221)

This invention relates to fastening devices, in particular removable fasteners, to join two or more objects which are substantially flat at the joint, such as e. g. plates or sheets of metal, laminated material, and the like, through substantially registering holes in them of equal or different sizes.

In particular the invention relates to removable fastenings for connecting a cover of any suitable shape with another object, such as a cowling with the rim of a man hole or filling-in orifice of another hollow body, such as e. g. a part of the wing or fuselage of an aircraft or the body of a vehicle.

More specifically the invention is concerned with removable fastenings for joining in a lap-joint two or more flat objects, such as e. g. plates or sheets of metal, such as aluminum or an aluminum alloy, laminated plastic material, and the like, which are accessible only from one side.

It is an object of the invention to simplify the manufacture of the elements of fastening devices of such type and their mounting.

It is another object of the invention to use more simple shapes for the elements of the fastening device which can be easily produced in inexpensive mass production and mounted in holes of regular, such as circular shape, without deforming the rims of the holes.

It is a particular object of the invention to use a pair of wire-like springy connecting members arranged across the hole through which the shank of the fastener is to be passed, and which engage the recessed and/or flattened shank from opposite sides so as to hold it in place when inserted and until it is turned into a blocking or fixing position.

It is a specific object of the invention to use a pair of wire-like springy connecting members arranged across the hole through which the shank of the fastener is to be passed so that these members are elastically deformed when a recessed and/or flattened shank portion is introduced between them and thereby hold the shank in place, and are preferably still more elastically deformed when or while the shank is forcibly turned by a predetermined angle into a blocking position in which said members engage a recessed portion of the shank.

These and other objects of the invention will be more clearly understood when the specification proceeds with reference to the drawings in which several features of the invention are exemplified.

In particular, Fig. 1 shows a cross section on the line 1—1 of Fig. 10 with parts in elevation through two sheets or plates connected by a fastener and springy connecting member according to the invention, with a fastener just being inserted; Fig. 2 shows a similar cross section on the line 1—1 of Fig. 10 as Fig. 1 with the fastener being turned by about 90° into its locking position; Fig. 3 shows a view along line 3—3 in Fig. 1; Fig. 4 shows a top view upon the two plates and the fastener in its locking position according to Fig. 2; Fig. 5 shows a top view and Fig. 6 shows a side view of the springy connecting member; Fig. 7 shows a cross section with parts in elevation of a modification of the invention with a fastener in its locking position; Fig. 8 shows a view from below of a dish-like member used in Fig. 7; Fig. 9 shows a cross section on the line 9—9 of Fig. 10 with parts in elevation of another modification of the invention; Fig. 10 shows a top view of that modification with the fastener in locking position; Fig. 11 shows a similar top view with the fastener inserted and being turned toward its locking position; Figs. 12 and 12a show in elevation two forms of a fastener as used in the modification of the invention according to Fig. 9; Fig. 13 shows a side view and Fig. 14 shows a top view of the fastener; Fig. 15 shows a cross section along line 15—15 in Fig. 12; Fig. 16 shows an elevation of another fastener and Fig. 17 shows a side view thereof; Fig. 18 shows a cross section along line 18—18 in Fig. 16; Fig. 19 shows a cross section on the line 19—19 of Fig. 20 with parts in elevation and Fig. 20 shows a top view of a member usable in connection with the modification shown in Figs. 9 to 11; and Figs. 21 and 22 show cross sectional end views along line 21—21 in Fig. 20 of alternative forms of projections.

Referring to Figs. 1 to 6, there is supposed that two sheets or plates 12, 13 are to be connected in a lap-joint. Plate 12 may be of any suitable material as mentioned above and form the outside wall of a wing, fuselage or any other part of an air-craft or other vessel. Plate or sheet 13 may belong to another part of such air-craft or vessel which is to be fastened to it and removed easily and readily, such as a lid or cowling to cover a man hole or other opening in the body of that air-craft or vessel. In particular, it is assumed that plate 12 and therefore plate 13 are accessible from one side only, in this case from the outside 14.

Plate or sheet 13 is provided with a hole 16 which is extended to lateral slots or recesses 17. Plate or sheet 12 is provided with an opening or hole 18 of preferably circular shape the diameter of which equals or is slightly larger than the largest dimension of slots 17 plus hole 16. On the non-accessible side of plate 12 a springy, loop-like connecting member 20 is fastened, for instance by means of rivets 21 the heads 22 of which are large enough to completely cover the bent ends 20—a of connecting member 20. The shanks 23 of the rivets are passed through the bent ends each of member 20 as well as holes 12—a in plate 12. The free ends of shanks 23 form sunk heads 24 the outer surfaces of which lie flush with the outer surface of plate or sheet 12. Member 20 may be made e. g. of springy steel wire and shaped the way shown in Figs. 5 and 6. The two lateral ends of the elongated loop formed by member 20 are curved so that shanks 23 can be passed therethrough and also lie flat on the inside surface of plate 12. Where member 20 freely crosses hole 18, it is somewhat bent inside the hole and provided with a dent or groove 25. On both sides of groove 25, upwardly projecting ramps 26 are formed. The elongated loop-like member 20 is arranged across hole 18 preferably in such a manner that its longest dimension coincides with that of slots 17 when body 13 is placed upon body 12.

In this exemplification of the invention a fastener is used comprising a flat or well rounded head 27 provided with a kerf 28, and a shank 29 in a transverse hole 29—a of which a pin 30 is fitted. Pin 30 and kerf 28 are preferably arranged in parallel so that the workman inserting the fastener can ascertain the position of the pin (which is invisible to him) from the position of the kerf.

If body 13 is to be fastened to body 12, body 13 is positioned upon plate 12 in such a way that hole 16 and slots 17 register with opening 18 and, in particular, the axis of hole 16 coincides with that of hole 18. Thereupon shank 29 of the fastener with the projecting ends of pin 30 is passed respectively through hole 16 and slots 17 from the accessible side 14 of the body 13 and thereafter the fastener is turned by means of a tool (not shown) inserted in kerf 28 so that the projecting ends of pin 30 slide over the springy member 20 and its ramps 26, as they are moved from their position shown in Fig. 1 to their position shown in Fig. 2, whereby member 20 is somewhat deformed elastically and pressed inside hole 18. After completion of a turn of about 90°, the projecting ends of pin 30 catch the grooves 25 while member 20 is preferably still somewhat deformed elastically and thereby holds firmly in place the projecting ends of pin 30. This blocked position of the fastener and projecting ends of pin 30 is shown in Figs. 2 and 4. The connecting member 20 if elastically deformed in the locking position, presses the bodies 12, 13 one against the other and thereby prevents relative movements thereof.

In order to facilitate the turning of the projecting ends of pin 30 over the connecting member 20, the latter is advantageously provided with depressions 31 on both sides of ramps 26; the depressions are preferably deeper than grooves 25 so that the ends of pin 30 do not deform member 20 when they pass over these depressions but are to press the ramps 26 downwardly and thereby elastically deform member 20; the latter may be still so deformed when the ends of pin 30 lie in the recesses 25 which are shallower than the depressions 31.

The arrangement according to Figs. 7 and 8 differs from that just described with reference to Figs. 1 to 6 in that the fastener is not inserted through a hole and slots in body 13—a but a dish-like member 32 is provided for receiving the fastener. To this end, a preferably circular hole 33 is provided in body 13—a preferably of the same size as hole 18 in body 12. The dish-like member comprises an outer flange 34 which is attached to body 13—a, and a center portion 35 provided with a hole 36 from which slots 37 extend radially so that somewhat springy flaps 38 are formed between them. Across hole 18 member 20 is arranged and riveted to body 12 the same way as described herein previously.

The fastener consists e. g. of a flat head 39 provided with a kerf 28—a; shank 29—b is grooved at 40 so as to receive the projecting ends of flaps 38 when the fastener is pressed through hole 36 the diameter of which is only slightly larger than the inner diameter of the circular groove 40. Pin 30 is tightly fitted into a transverse hole 29—c of shank 29—b and preferably arranged parallel to kerf 28—a so that the position of pin 30 can be recognized from the accessible outside 14 of body 13—a.

Before assembling bodies 12, 13—a, shank 29—b is pressed through hole 36 and thereby fixed in its position relative to the dish-like member 32; thereafter pin 30 is driven through the hole 29—c of shank 29—b. Body 13—a is then positioned upon body 12 so that holes 33 and 18 register and pin 30 is parallel to the longest dimension of the springy connecting member 20. Upon turning the fastener by about 90°, pin 30 rides over and deforms member 20 until the projecting ends of pin 30 snap into grooves 25 of member 20. In this locking position of pin 30 the member 20 is preferably still elastically deformed as described with reference to Figs. 1 to 6 whereby any loosening of the fastener is avoided.

It is obvious that body or plate 13—a can be provided with any desired number of holes 33, members 32 mounted in those holes by attaching the flange 34 to the body 13—a and the fastener mounted in each member, so that each body 13—a is ready for being mounted on another body 12.

Referring to Figs. 9 to 14, there is another form of fastener shown which can be used for the purposes of the invention. The fastener consists of a head 27 provided with a kerf 28, and a shank 41 the top 42 of which is rounded or tapered and is flattened on opposite sides 42—a, as to be seen best on Figs. 12, 13 and 14. The opposite flattened sides 42—a of the top portion of the shank preferably end into shallow grooves 43, and grooves 44 are provided on both front ends of that portion which are deeper than grooves 43 if the latter are present. Thus the distance between the grooves 43 is considerably smaller than that between the grooves 44, and the bottoms or apices of grooves 43 and 44, respectively, are substantially straight and parallel, resulting in a substantially rectangular cross section of the shank portion between those two pairs of grooves 43, 44. If grooves 43 are omitted, the flattened sides 42—a of top 42 extend to the cylindrical portion of shank 41 (Fig. 12a).

Referring to Figs. 9 and 10, plate or sheet 12 is provided with a hole 45 of slightly larger diameter than shank 41 and plate or sheet 13 is provided with a hole 33 of considerably larger diameter for receiving a dish-like member 32 of substantially the same type as shown and described above with reference to Figs. 7 and 8. The center portion 35 of that member has radial slots 37 and is provided with a hole 36 so that shank 41 may be pressed therethrough and the flaps 38 formed in the center portion of dish 35 enter a circular groove 40 near the bottom end of shank 41.

Across hole 45 and on the non-accessible side of plate or sheet 12, a U-shaped springy member 46 is mounted. A rivet 46—a is passed through the bent portion of member 46 so that an enlarged portion of its head 47 rests on and a reduced portion 47' lies within that bent portion, while its shank 48 passes a hole 12—a in body 12 and is secured therein by means of a sunk head 49. The free ends of member 46 are slidably held in place by means of a substantially T-shaped head 50 of a rivet 50—a the shank 51 of which is riveted into a hole 12—b of body 12.

It will be appreciated that the two legs of U-shaped member 46 can be flexed or bowed apart, and that thereby elastic stresses are caused therein.

In securing body 13 to body 12, fastener 41 is turned in a position in which the larger dimension of its flattened top portion 42 is parallel to the legs of the member 46 and is then pressed between the latter whereby the legs of member 46 are somewhat deformed and bowed apart and either frictionally hold the top or snap into grooves 43 if provided. Thereby the fastener is held in place preliminarily. Thereupon the fastener is forcibly turned by about 90° by inserting a tool into its kerf 28, whereby the legs of member 46 are further flexed apart, as shown in Fig. 11, and finally snap into grooves 44, as shown in Fig. 10. It will be appreciated that by the large deformation of member 46 required for turning the fastener into its blocking position and for returning it therefrom, and the great elastic stress thereby caused in member 46, furthermore by the shape of grooves 44, the fastener is firmly held in its blocked position.

In order to separate again body 13 from body 12, the fastener is to be returned forcibly from its position shown in Figs. 2 and 4 by means of a tool inserted in kerf 28 whereby connecting member 20 is elastically deformed. The same way the fastener is to be returned from its position shown in Figs. 9, 10. Thereupon body 13 falls off or can be pulled off body 12, the latter if the legs of member 46 engage grooves 43 or grip the flattened sides of top 42 frictionally.

Instead of using a flattened top of the fastener as just described, its shank 52 may be cylindrical throughout and provided with one pair of parallel grooves 53 only on opposite sides below its preferably tapered or rounded off top, as shown in Figs. 16, 17 and 18. Grooves 53 have substantially parallel and straight bottoms and thereby lock shank 52 in its final position. In order to return the fastener to its initial position in which it was inserted, a tool is to be inserted into kerf 28 and the fastener to be turned back by about 90° with considerable force.

Instead of mounting member 46 on body 12 by means of rivets, an intermediate member 54 can be used. This member 54, Figs. 19 to 22, consists of a flat center portion 55 provided with a hole 56 to be aligned with hole 45 of body 12. At one end of portion 55, a projection 57 is provided and rolled to form a lug in which member 46 can be attached. At the opposite end of portion 55 either a projection 58 is arranged in which there is provided a single broad slot 59 Fig. 22) or a projection 58—a in which individual holes 60 are provided (Fig. 21); projections 58 and 58a are bent upwardly as shown in the drawings. The free ends of member 46 are received through slot 59 or holes 60 and thereby the springy connector 46 is held in place.

Member 54 as shown, is riveted to body 12 by means of rivets 54—a.

It will be appreciated that any type of fastener as exemplified in Figs. 12 to 18 can be used in connection with the mounting illustrated on Figs. 19 to 22.

It is to be understood that the invention is not limited to any exemplification herein before described and shown in the drawings but is to be derived in its broadest aspects from the appended claims. Its outstanding features and advantages are the following: a number, two as a minimum, of elastic connecting members are arranged on one (the non-accessible) side of the bodies to be joined extending across registering holes in the bodies and mounted on the non-accessible body on either side of its hole. A proper fastener is to be inserted from one (accessible) side of the bodies in a predetermined initial position relative to the connecting members in which its shank meets only slight or no obstruction at all to its passing these members; when so inserted and turned thereafter by a predetermined minimum angle, the fastener elastically deforms the connecting members and is eventually blocked by them. From this blocking position the fastener can be returned to its initial position in which the bodies can be separated, only by a force sufficient to elastically deform the connecting members. To these effects the shank of the fastener is provided near its free end with means capable of engaging the connecting members and to elastically deform them only while the fastener is being turned from its initial to its blocking position and vice versa; these means may also, if desired, so deform the members in the blocking position but are in any event clear of them in the initial position. These engaging means may consist either in projections, Figs. 1 through 7, or recesses, Figs. 9 through 20.

What I claim is:

1. A fastening device for joining at least two objects, such as plates or sheets, covering one another and provided with registering openings at the joint, substantially comprising a fastener consisting essentially of a head, a cylindrical shank and a pair of projections associated with said shank and exemplified by a pin tightly fitted into a transverse hole of said shank, said projections arranged on opposite sides of said shank near its free end, a dish-like member mounted in the opening of one of the objects through which said fastener is passed first, said dish-like member provided with a circular opening having a pair of opposed radially extending slots thereby permitting only said shank and projections to pass therethrough, a pair of elongated springy members as exemplified by springy wires arranged on the uncovered outside of the other one of the objects across its opening, said springy members each provided with a groove and ramps on both sides thereof for receiving said projections, said members spaced so that said shank with projections can pass between them substantially unobstructed but are flexed elastically when said shank with projections is being turned after having passed said members and said projections ride over one ramp each of said members, and engage said groove therein, and means for securing said members to said other object outside its opening and spaced from said grooves so that said members can be flexed by said projections.

2. A fastening device for joining at least two objects, such as plates or sheets, covering one another and provided with registering openings at the joint, substantially comprising a fastener consisting essentially of a head, a cylindrical shank and a pair of projections associated with the shank and exemplified by a pin tightly fitted into a transverse hole of said shank, said projections arranged on opposite sides of said shank near its free end, a dish-like member mounted in the opening of one of the objects through which the fastener is passed first, said dish-like member provided with a circular opening having a pair of opposed radially extending slots so as to permit only said shank with projections to pass therethrough, said dish-like member also provided with slits extending radially from said circular opening between said slots so as to form flaps between them, said shank provided with a circular groove near its bottom to be engaged by said flaps when said shank is passed through said hole, a pair of elongated springy members as exemplified by springy wires arranged on the uncovered outside of the other one of the objects across its opening, said springy members each provided with a groove and ramps on both sides thereof for receiving said projections, said members spaced so that said shank with projections can pass between them substantially unobstructed but are flexed elastically when said shank with projections is being turned after having passed said members and said projections ride over one ramp each of said members, and engage said groove therein, and means for securing said members to said other object outside its opening and spaced from said grooves so that said members can be flexed by said projections.

3. A fastening device for joining two objects covering one another and provided with registering openings, comprising a fastener consisting of a head, a shank having a circumferential groove, and a pair of projections arranged on opposite sides of said shank, a dish-like member mounted in the opening of one of the objects through which the fastener is first passed, and provided with a central opening and slits radiating from said opening to form flaps between the slits, said flaps having their inner ends engaged in the groove of the shank when the shank is passed through the opening in the member, and a pair of elastic wires mounted on the uncovered outside of the other one of the objects, across its opening, and relatively spaced so that said shank with its projections can pass therebetween, when the shank is positioned so that the projections extend from the shank parallel with the wires, the wires being tensioned by the engagement of the projections therewith when the shank is turned to a position so that the projections extend transversely of the wires.

4. A fastening device for joining two objects covering one another and provided with registering openings, comprising a fastener consisting of a head, a shank having a circumferential groove, and a pin transfixing said shank, its ends forming aligned projections from said shank, a dish-like member mounted in the opening of one of the objects through which the shank is first passed, and provided with a central opening and slits radiating from said opening to form flaps between the slits, said flaps having their inner ends engaged in the groove of the shank when the shank is passed through the opening of the member, and a pair of elastic wires mounted on the uncovered outside of the other one of the objects, across its opening, and relatively spaced so that said shank with its projections can pass therebetween, when the shank is positioned so that the projections extend from the shank parallel with the wires, a pair of aligned grooves formed by the wires, respectively, the projections being received in said grooves, respectively, and tensioning the wires, when the shank is turned to a position so that the projections extend transversely of the wires.

5. A fastening device for joining two objects covering one another and provided with registering openings, comprising a fastener consisting of a head, a shank having a circumferential groove and a pair of aligned projections extending radially from said shank, a dish-like member mounted in the opening of one of the objects through which the fastener is first passed, and provided with a central opening, and a pair of aligned slots extending radially from said opening, the opening and slots being so related that the shank and its projections can be passed, respectively, therethrough, the member being provided further with slits radiating from its central opening to form flaps between the slits, said flaps having their inner ends engaged in the groove of the shank when the shank is passed through the opening in the member, and a pair of elastic wires mounted on the uncovered outside of the other one of the objects, across its opening, and relatively spaced so that said shank with its projections can pass therebetween, when the shank is positioned so that the projections extend from the shank parallel with the wires, the wires being tensioned by the engagement of the projections therewith when the shank is turned to a position so that the projections extend transversely of the wires.

FRITZ VON OPEL.

CERTIFICATE OF CORRECTION.

Patent No. 2,352,045.                                      June 20, 1944.

FRITZ von OPEL.

It is hereby certified that error appears in the printed specification of the above numbered patent requiring correction as follows: Page 1, second column, lines 1 and 6; for "Fig. 10" read --Fig. 3--; and that the said Letters Patent should be read with this correction therein that the same may conform to the record of the case in the Patent Office.

Signed and sealed this 15th day of August, A. D. 1944.

Leslie Frazer

(Seal)                                          Acting Commissioner of Patents.